United States Patent Office 3,459,155
Patented Aug. 5, 1969

3,459,155
APPARATUS FOR APPLYING FUSIBLE MATERIALS, PARTICULARLY SOLDERS, TO SURFACES
Wolfgang Rossner, Nuremburg, Germany, assignor to Siemens Aktiengesellschaft, a corporation of Germany
Filed Apr. 28, 1967, Ser. No. 634,763
Claims priority, application Germany, Apr. 29, 1966, S 103,490
Int. Cl. B05c 1/00
U.S. Cl. 118—202    4 Claims

ABSTRACT OF THE DISCLOSURE

Apparatus for applying fusible material to a surface includes a friction roller mounted for movement in direction toward the surface to which the material is to be applied, and means for adjusting the pressure of the friction roller against the surface to which the material is to be applied.

Figure 1:
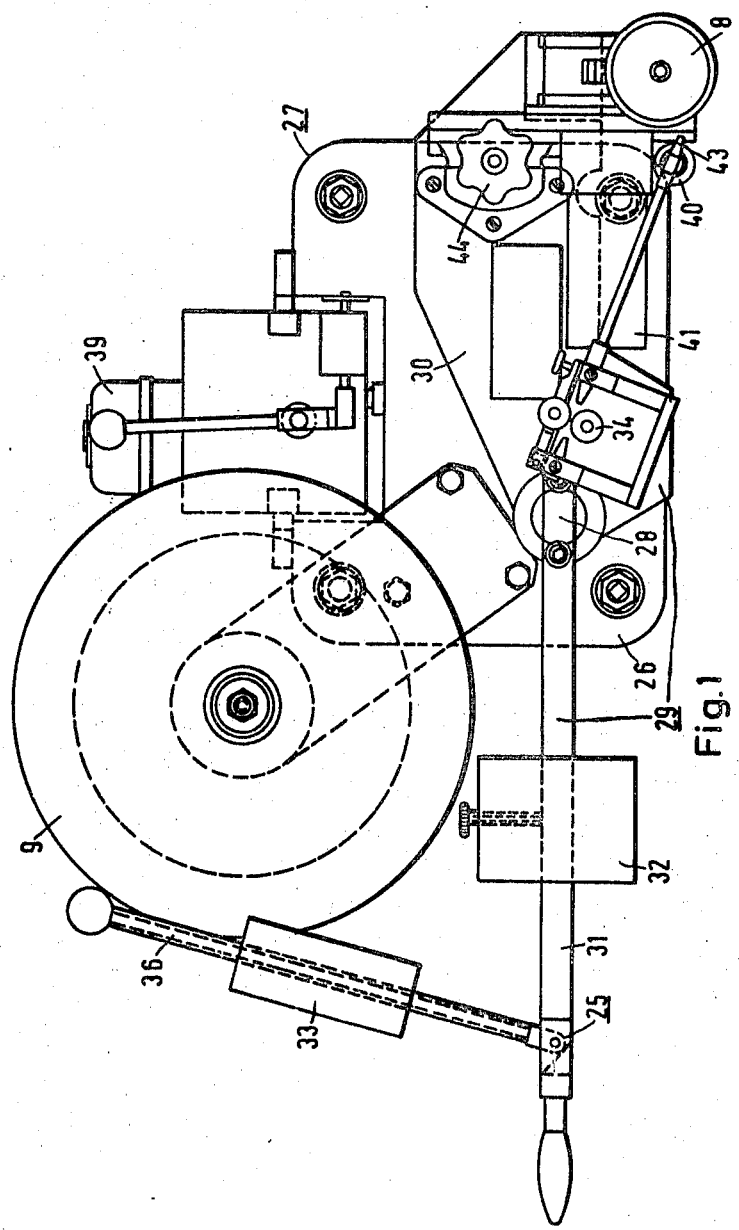

My invention relates to apparatus for applying fusible materials, such as solders for example, to surfaces.

In my copending application Ser. No. 482,232, filed Aug. 24, 1965, I provide method and apparatus for applying fusible materials, particularly solders, to surfaces, wherein the material to be applied is supplied with predetermined velocity and quantity to a preheatable friction roller which rotates and simultaneously executes a feed movement with respect to the surface to be soldered and is in constant frictional engagement with the surface to be soldered so as to thereby transfer thereto the material to be applied.

The method of my aforementioned copending application advantageously permits both solid as well as liquid fusible application materials to be supplied to the friction roller and to be deposited on the surface to be appied with the material in a uniform layer of virtually any degree of thinness. Due to the high rate of application of the material, the thermal loading or stressing of the surface to be applied with the material is kept very small. This is a matter of great advantage for electrical devices insulated with plastic materials, such as capacitors for example, because therewith the danger of sporadic melting and decomposition of the plastic insulating material is largely eliminated.

It is an object of my invention to provide an apparatus improved over that described in my aforementioned copending application in that the frictional contact between the friction roller and the surface to be applied with the material is adjustable to the operating conditions such as the composition of the material to be applied, the structure and particularly the surface structure of the surface to be applied with the material, the thickness of the layer of applied material, or the like.

With the foregoing and other objects in view, I provide in accordance with my invention apparatus for applying fusible materials to surfaces which comprises a friction roller mounted for movement in direction toward the surface on which the material is to be applied and means for adjusting the pressure of the friction roller against the surface on which the material is to be applied. Due to the movable arrangement of the friction roller, relative to the surface on which the material is to be applied, any roughness of that surface can be evened off. Simultaneously, the pressure of the friction roller against that surface can be adjusted to the peculiarities of the material to be applied and of the surface on which the material is to be applied. For example, when applying solders such as tin-zinc alloys, the pressure of the friction roller against the surface on which the solder is to be applied can be adjusted to the zinc content and to the grain size of the zinc component of the solder so that the surface on which the solder is to be applied is adequately roughened.

In accordance with a further feature of my invention, the friction roller is attached to a lever system rotatably mounted on the travel mechanism or carriage of the material-applying apparatus. By employing a lever stem, the pressure at which the material is applied is able to be adjusted relatively simply, using the principle of operation of a balance scale.

In accordance with further features of my invention, the lever system has the construction of a double-armed lever, the friction roller being seated on one of the lever arms, and one or more counterweights being displaceably or slidably mounted on the other of the lever arms. When the counterweight is subdivided into several individual weights for coarse and fine adjustment, the pressure of the friction roller can be adjusted very finely to those values or parameters which determine the required pressure to be applied, such as the type and structure of the material to be deposited, the nature of the surface on which the material is to be applied, the thickness of the layer of material being applied and the rate of feed and the tangential or peripheral velocity of the friction roller, so that the layer of material being applied is sufficiently uniform and assures adequate bonding to the surface to which it is being applied.

In accordance with yet another feature of the invention, the lever arm carrying the counterweight or weights is provided with a shift lever with which the friction roller is able to be brought into operating position. The shift lever offers the further advantage that the friction roller can be rapidly raised from the surface on which the material is being applied and can be speedily reintroduced without interrupting the friction roller cross-feed, the supply of material to be applied, and the like. This is of particular advantage for contact bonding capacitor foil pockets, when several individual windings are to be connected one behind the other, or in series, so that the applied material must be broken or interrupted at several locations of the surface to be applied. A foil is thus advantageously provided at the location of the break or interruption of the applied material and can be turned through an angle of 180° during the period in which the friction roller is raised, so that a narrowly limited break or dividing line is attainable transversely to the direction in which the material is applied.

Other features which are considered as characteristic for the invention are set forth in the appended claims.

Although the invention is illustrated and described herein as embodied in apparatus for applying fusible materials, particularly solders, to surfaces, it is nevertheless not intended to be limited to the details shown, since various modifications and structural changes may be made therein without departing from the spirit of the invention and within the scope and range of equivalents of the claims.

Figure 2:
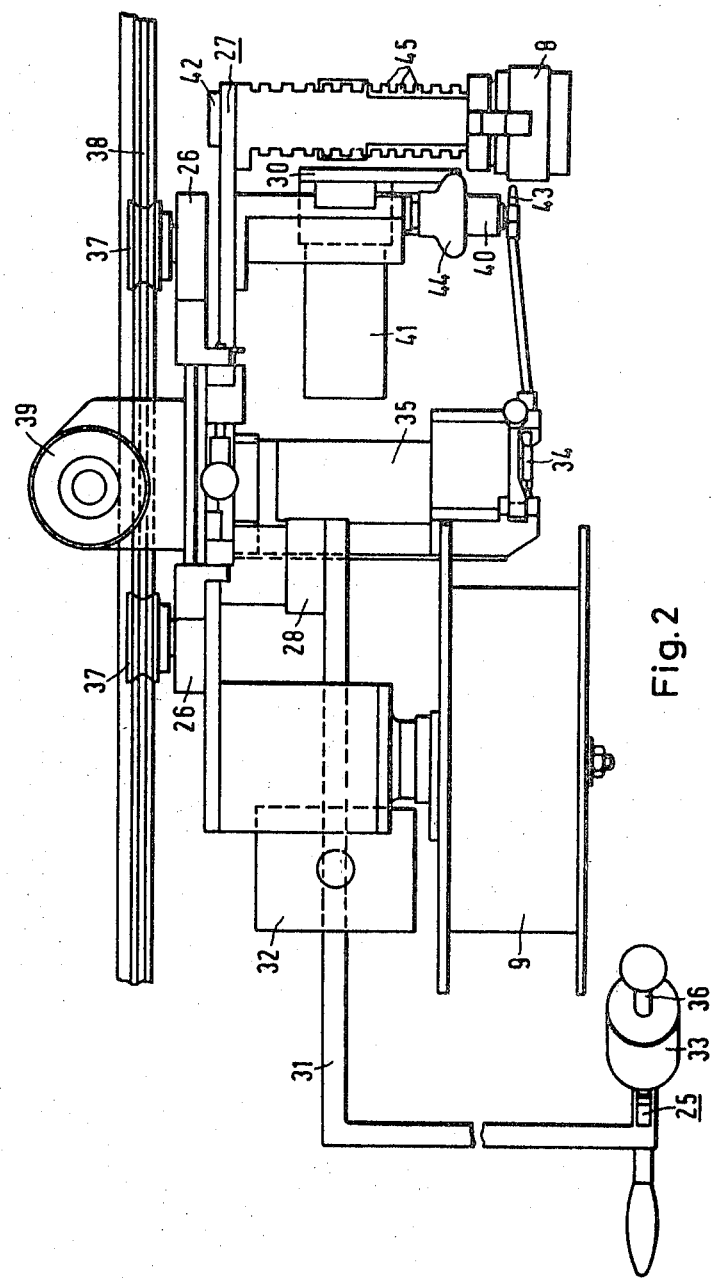
Figure 3:
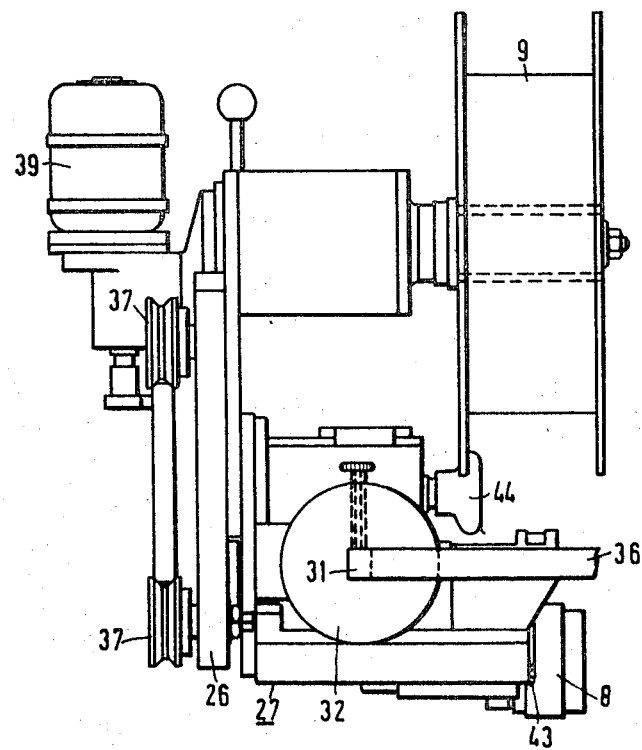

The construction and method of operation of the invention, however, together with additional objects and advantages thereof, will be best understood from the following description of a specific embodiment when read in connection with the accompanying drawings, in which:

FIG. 1 is a side elevational view of the apparatus for applying fusible materials to surfaces which is constructed in accordance with my invention; and FIGS. 2 and 3 are top plan and front elevational views respectively of FIG. 1.

Referring now to the drawings there is shown a friction roller 8 and a supply roller 9 for supplying fusible material such as solder in filamentary form i.e. wire or band, to be applied to a surface. The friction roller 8 is attached to a lever system which is pivotally mounted on a travel mechanism or carriage 26 of the applicator device 27. The center of rotation thereof is a shaft located at 28. The lever system 25 has the construction of a double or two-armed lever 29, the friction roller 8 being seated on one arm 30 thereof, and two weights 32 and 33 being displaceably or slidably mounted on the other arm 31 thereof. The lever arm 30 carrying the friction roller 8 has the form of a base plate to which a wire-feeding device 34 of conventional construction and a drive-motor 35 therefor are also secured. A shift lever 36 is advantageously articulatingly connected to the other lever arm 31 and is pivotable so as to place the friction roller 8 in operating position with the location of the shift lever 36 shown in FIG. 1, the friction roller 8 is in its operating position i.e. it has been lowered into engagement with the non-illustrated surface to which the fusible material is to be applied and presses against that surface with a predetermined pressure determined by the weights 32 and 33. In the embodiment illustrated in the drawings, the weight 33, which is slidable along the lever arm 36, acts as coarse adjusting means, and the weight 32, which is slidable along the lever arm 31, acts as fine adjusting means for controlling the pressure to be exerted by the friction roller against the surface on which the fusible material is to be applied.

The travel mechanism 26 is guided by rollers 37 (FIG. 2) along guide rails 38. A motor 39 serves as the drive means for the travel mechanism 26. A motor 41 drives a wire or band oscillating device 40 which is conventionally constructed preferably as a cardioid cam control to achieve a linear oscillation or reciprocation for cross-feeding the wire or band in a direction transversely to the travel direction of the travel mechanism or carriage 26. The friction roller 8 is driven by a motor 42 (FIG. 2). A guide nozzle 43 for the material to be applied can be suitably adjusted in position by the set screw 44. The drive motor 42 for the friction roller 8 is provided with cooling fins or ribs 45 (FIG. 2) to protect it from excessive heat produced by the heatable friction roller 8. Although the specific means for heating the friction roller 8 are not shown, it may be an electric heating coil or any other suitable heating device.

I claim:

1. Apparatus for applying fusible material to a surface, comprising a friction roller mounted for movement in direction toward a surface to which the material is to be applied, supply means for supplying the material to the peripheral surface of said friction roller at a predetermined rate so that the material is transferable from said friction roller to the surface to which it is to be applied, said supply means comprising a supply roll for the material to be applied to the surface in filamentary form, means for adjusting pressure of said friction roller against the surface to which the material is to be applied, travel mechanism for displacing the apparatus in a given direction, and a lever system pivotally mounted on said travel mechanism, said friction roller being carried by said lever system, said lever system comprising a two-armed lever, said friction roller being seated on one arm of said lever, and at least one counterweight being displaceably mounted on the other arm of said lever.

2. Apparatus for applying fusible material to a surface, comprising a friction roller mounted for movement in direction toward a surface to which the material is to be applied, supply means for supplying the material to the peripheral surface of said friction roller at a predetermined rate so that the material is transferable from said friction roller to the surface to which it is to be applied, means for adjusting pressure of said friction roller against the surface to which the material is to be applied, travel mechanism for displacing the apparatus in a given direction, and a lever system pivotally mounted on said travel mechanism, said friction roller being carried by said lever system, said lever system comprising a two-armed lever, said friction roller being seated on one arm of said lever, and at least one counterweight being displaceably mounted on the other arm of said lever, and means for cross-feeding the filamentary material to be applied to the surface in a direction transverse to said given direction of displacement of the apparatus, said cross-feed means being fixed to said one arm of said lever.

3. Apparatus for applying fusible material to a surface comprising a friction roller mounted for movement in direction toward a surface to which the material is to be applied, supply means for supplying the material to the peripheral surface of said friction roller at a predetermined rate so that the material is transferable from said friction roller to the surface to which it is to be applied, means for adjusting pressure of said friction roller against the surface to which the material is to be applied, travel mechanism for displacing the apparatus in a given direction, and a lever system pivotally mounted on said travel mechanism, said friction roller being carried by said lever system, said lever system comprising a two-armed lever, said friction roller being seated on one arm of said lever, and at least one counterweight being displaceably mounted on the other arm of said lever, and a shift lever attached to said other arm of said lever and adjustable for placing said friction roller in operating position against a surface to which the material is to be applied.

4. Apparatus according to claim 3 including an additional weight carried by said shift lever.

References Cited

UNITED STATES PATENTS

| 2,783,735 | 3/1957 | Paulsen | 118—202 XR |
| 2,900,952 | 8/1959 | Perry | 118—207 |
| 2,911,942 | 10/1959 | Gross | 118—202 |
| 2,957,448 | 10/1960 | Dynia | 118—207 XR |

BILLY J. WILHITE, Primary Examiner

R. I. SMITH, Assistant Examiner